United States Patent [19]

Matty

[11] 3,783,339

[45] Jan. 1, 1974

[54] METHOD OF AND APPARATUS FOR PRODUCING A VEHICLE MOVEMENT CONTROL SIGNAL IN RESPONSE TO SENSING THE DIRECTION OF TRAVEL OF A VEHICLE

[75] Inventor: Thomas C. Matty, Irwin, Pa.

[73] Assignee: Westinghouse Electric Corporation, Pittsburgh, Pa.

[22] Filed: Jan. 26, 1972

[21] Appl. No.: 220,829

[52] U.S. Cl. .................. 317/5, 307/232, 318/683, 324/83 A, 340/52 R, 340/271
[51] Int. Cl. ............................................. H02p 15/00
[58] Field of Search ................... 104/151; 105/61; 307/232, 148, 122, 269, 253; 317/5, 33; 318/8, 99, 683; 324/165, 83 A, 83 D, 86; 340/52 R, 62, 263, 271

[56] References Cited
UNITED STATES PATENTS

| | | | |
|---|---|---|---|
| 3,299,702 | 1/1967 | Hulme | 324/165 |
| 3,571,688 | 3/1971 | Tomasulo, Jr. et al. | 307/232 X |
| 3,559,008 | 1/1971 | Stut et al. | 318/8 |
| 3,304,496 | 2/1967 | Lorenz | 307/232 X |

FOREIGN PATENTS OR APPLICATIONS

| | | | |
|---|---|---|---|
| 1,298,297 | 6/1969 | Germany | 324/165 |

Primary Examiner—George E. A. Halvosa
Assistant Examiner—Stephen G. Kunin
Attorney—F. H. Henson et al.

[57] ABSTRACT

A pair of tachometers are operatively engaged with the drive mechanism of a vehicle. The tachometers are aligned relative to one another such that if the vehicle is traveling in a forward direction the signal provided at the output of the first tachometer leads the signal provided at the output of the second tachometer by a first predetermined phase angle, and if the vehicle is traveling in the reverse direction, the signal output of the second tachometer leads the signal output of the first tachometer by a second predetermined phase angle. Apparatus is included for sensing the relative phase of the respective signals provided at the outputs of the tachometers. In response to sensing that the output signal of the first tachometer leads the output signal of the second tachometer by the first predetermined phase angle, a vehicle movement control signal is provided which informs the vehicle drive mechanism that it is safe for the vehicle to continue its movement. In the event the apparatus senses that the output signal of the second tachometer leads the output signal of the first tachometer by the second predetermined phase angle, the provision of the vehicle movement control signal is inhibited.

8 Claims, 15 Drawing Figures

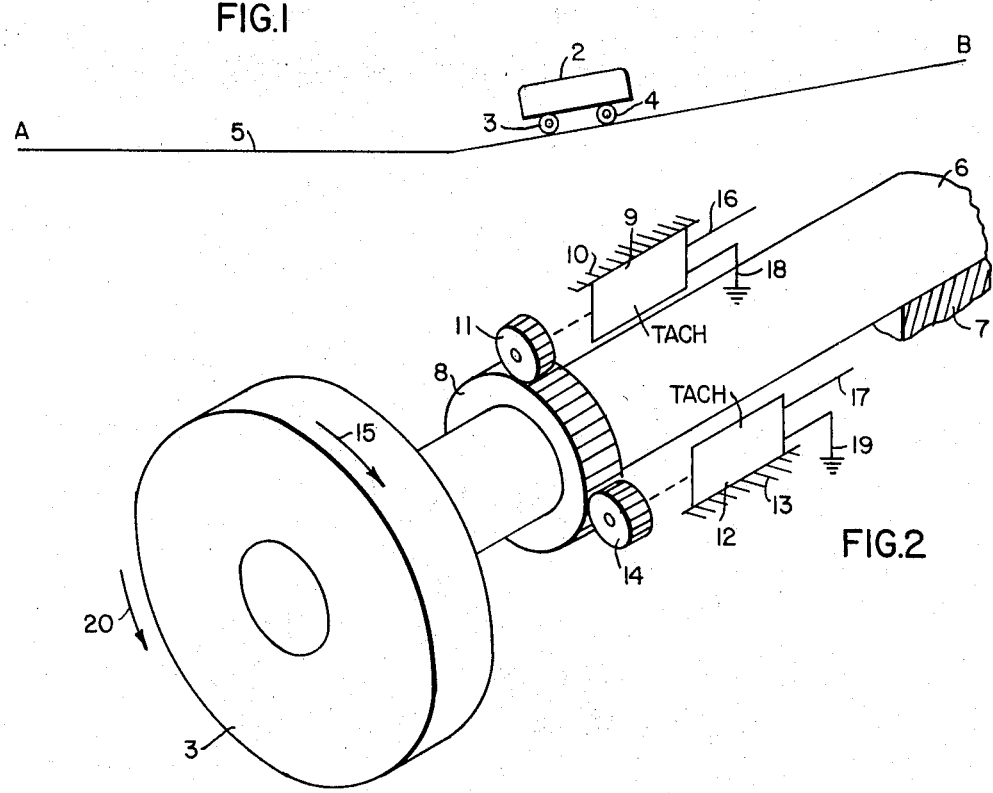
FIG.1
FIG.2
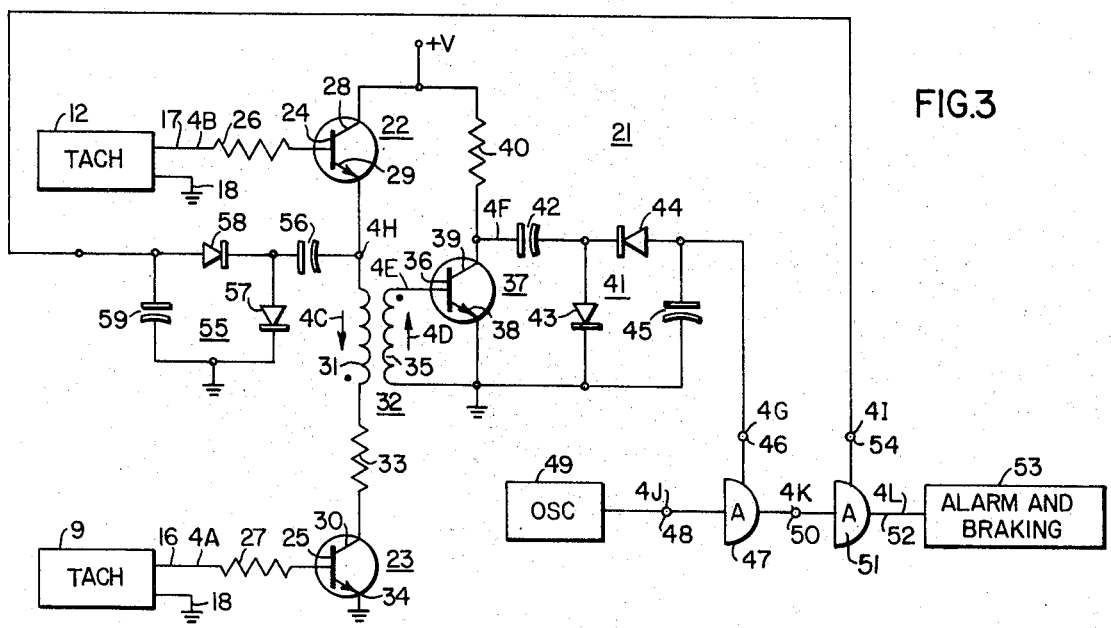
FIG.3

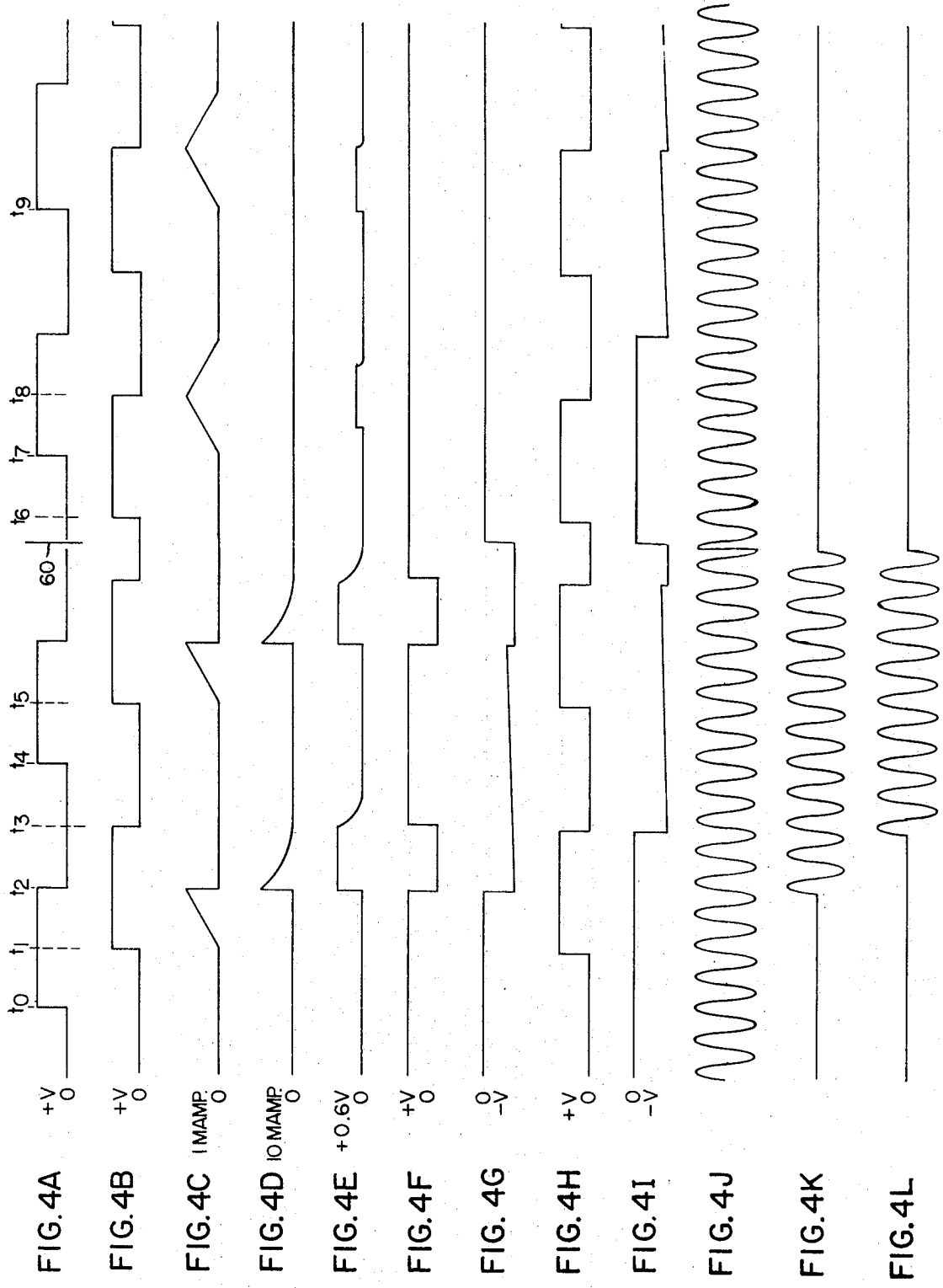

METHOD OF AND APPARATUS FOR PRODUCING A VEHICLE MOVEMENT CONTROL SIGNAL IN RESPONSE TO SENSING THE DIRECTION OF TRAVEL OF A VEHICLE

CROSS REFERENCE TO RELATED APPLICATIONS

Reference is made to U.S. Pat. No. 3,600,604 by George M. Thornebooth, which is assigned to the assignee of the present invention.

BACKGROUND OF THE INVENTION

There is a need to sense the direction of travel of a vehicle operative in an automated vehicle control system so that the safety of the passengers is assured at all times. If a vehicle leaves a first control block and enters a second control block, and then begins to "roll-back" into the first control block, the possibility exists that the vehicle could collide with a following vehicle. To protect against such occurrences, direction of travel sensing apparatus is needed.

Generally, prior art apparatus for sensing the direction of travel of the vehicle comprised a mechanical mechanism that was rather large and difficult to align. There is a need to provide electronic direction sensing apparatus which is relatively compact, easy to manufacture, has a low production cost, and which is extremely reliable. It is the object of this invention to provide a direction sensing mechanism of the latter type.

SUMMARY OF THE INVENTION

According to the teachings of the present invention, a method and system for sensing the direction of movement of a vehicle is provided. There are means for providing first and second signals displaced relative to one another in a first predetermined phase relationship in response to the vehicle moving in a first direction, with the first and second signals being displaced relative to one another in a second predetermined phase relationship in response to the vehicle moving in the opposite direction. There are also included means for providing a vehicle movement control signal in response to sensing that the first and second signals are displaced from one another according to the first predetermined phase relationship. Also included are means for inhibiting the provisions of the vehicle movement control signal in response to sensing that the first and second signals are displaced from one another according to the second predetermined phase relationship.

BRIEF DESCRIPTION OF THE DRAWINGS

FIG. 1 is a pictorial representation of a vehicle traveling along a vehicle travel path.

FIG. 2 is a view of one wheel and a portion of one axle of the vehicle including a pair of tachometers operative with a gear mechanism on the axle for sensing the direction of movement of the vehicle.

FIG. 3 is a schematic and block diagram representation of the direction sensing apparatus embodying the teachings of the present invention.

FIGS. 4A through 4L are wave-shape relationship diagrams helpful in the understanding of the operation of the apparatus illustrated in FIG. 3.

DESCRIPTION OF THE PREFERRED EMBODIMENT

In FIG. 1 there is generally shown a vehicle 2 supported in part by wheels 3 and 4, and which travels along a vehicle travel path 5 in a first or forward direction from the point A to the point B. If the vehicle 2 for one reason or another reverses its direction of travel and moves from the point B to the point A, this will be termed a reverse or opposite direction of travel. The reverse direction of travel may also be termed a rollback condition.

Refer now to FIG. 2 which is a view of the wheel 3 including an axle 6 which is mounted to the chassis (not shown) of the vehicle 2 as indicated by the symbol 7. Mounted on the axle 6 is a gear 8 which rotates with the axle 6 as the vehicle 2 progresses in one direction or the other along the vehicle travel path 5. A tachometer 9 is secured to the chassis (not shown) of the vehicle 2 as indicated by the symbol 10, and is operatively engaged with the gear 8 by means of a gear 11. A second tachometer 12 is secured to the chassis of the vehicle 2 (not shown) as indicated by the symbol 13 and is operatively engaged with the gear 8 by means of a gear 14. The tachometers 9 and 12 are aligned relative to one another in a predetermined relationship such that if the vehicle is traveling in a forward direction as indicated by the arrow 15, an output signal is provided on an output signal lead 16 of the tachometer 9 which is displaced in a first predetermined relationship from the output signal appearing on the output lead 17 of the tachometer 12. The second output leads 18 and 19 of the tachometers 9 and 12, respectively, are connected to circuit ground. In the event the vehicle 2 is in a rollback condition and is traveling in a reverse direction as indicated by the arrow 20, the output signals appearing at the leads 16 and 17 are displaced from one another in a second predetermined phase relationship. The function of the signals appearing on the leads 16 and 17 is to be described shortly. In practice, the tachometers may be magnetically or optically coupled to the gear 8 rather than mechanically coupled as illustrated.

Refer now to FIG. 3 which is a schematic and block diagram representation of the vehicle movement sensing and control apparatus 21 which embodies the teachings of the present invention. First and second switches such as the transistors 22 and 23 have their base electrodes 24 and 25 connected to the signal output leads 17 and 16 of the tachometers 12 and 9, respectively, by way of the current limiting resistors 26 and 27, respectively. The collector electrode 28 of the transistor 22 is connected to a source of operating potential or power, +V. The emitter electrode 29 of the transistor 22 is connected to the collector electrode 30 of the transistor 23 through the series connection of a signal storage means such as the primary winding 31 of a transformer 32 and also through a current limiting resistor 33. The emitter electrode 34 of transistor 23 is connected to circuit ground. The secondary winding 35 of the signal storage means or transformer 32 has one terminal connected to circuit ground and the other terminal connected to the base electrode 36 of an amplifier such as the transistor 37. The emitter electrode 38 of the transistor 37 is connected to circuit ground and the collector electrode 39 of the transistor 37 is connected to the source of operating potential +V through a resistor 40. The collector electrode 39 is also connected to the input of a first detector 41 which is comprised of a charge storage device, such as the capacitor 42, a unidirectional current device such as the diode 43, a unidirectional current device such as the diode 44, and a charge storage device such as the capacitor 45. The output of the detector 41 is connected to the control terminal 46 of a gate such as the AND gate 47 which has its input terminal 48 connected to a signal means such as the oscillator 49. The output of the gate 47 is connected to the signal input 50 of a gate such as the AND gate 51. The output of the AND gate 51 is connected by way of a line 52 to an alarm and braking circuit 53. The gate 51 has its control terminal 54 connected to the output of a second detector 55 which has its input connected to the common connection of the emitter 29 of the transistor 22 and the primary winding 31 of the transformer 32. The detector 55 is comprised of a charge storage device such as the capacitor 56, a unidirectional current device such as the diode 57, a unidirectional current device such as the diode 58 and a charge storage device such as the capacitor 59.

The letters 4A through 4L found on FIG. 3 are the circuit points at which the waveshapes illustrated in FIGS. 4 through 4L, respectively, are manifested in the circuitry of FIG. 3. Consider now the operation of the vehicle movement sensing and control apparatus 21. As was previously explained, the tachometers 9 and 12 provide on the output leads 16 and 17 respectively first and second signals displaced relative to one another in a first predetermined phase relationship in response to the vehicle moving in a first direction, for example, a forward direction. In response to the vehicle moving in the opposite or reverse direction the first and second signals appearing on the leads 16 and 17 are displaced relative to one another in a second predetermined phase relationship. The apparatus 21 provides a vehicle movement control signal on the lead 52 to the input of the alarm and braking network 53 in response to the apparatus 21 sensing that the first and second signals manifested on the leads 16 and 17 are displaced from one another according to the first predetermined phase relationship. The apparatus 21 also includes means for inhibiting the provision of the vehicle movement control signal on the lead 52 in response to sensing that the first and second signals manifested on the leads 16 and 17 are displaced from one another according to the second predetermined phase relationship.

Assume for the moment that the vehicle 2 is traveling in the forward direction and the tachometers 9 and 12 are providing first and second signals on the leads 16 and 17 which are therefore displaced from one another according to the first predetermined phase relationship. For example, the signal appearing on the lead 16 is a periodic squarewave signal as illustrated by FIG. 3A and the signal appearing on the lead 17 from the tachometer 12 is a periodic square wave signal displaced in a first predetermined phase relationship, that first predetermined relationship being that the first signal state of the output signal from the tachometer 9 is 90° in phase ahead of the first signal state of the output signal from tachometer 12 (see FIG. 4B). At a time t0 the periodic squarewave signal applied to the base electrode 25 of the transistor 23 through the current limiting resistor 27 is at a relatively positive level or first signal state such as +V. The emitter electrode 34 of the transistor 23 is at zero volts since it is connected to circuit ground, and the transistor 23 is, therefore, in a condition to become conductive (see FIG. 3A). At this time, however, the signal applied to the base electrode 24 of the transistor 22 (see FIG. 4B) is displaced in phase by 90° from the signal applied to the base electrode of transistor 23 and is at a second signal state or a zero volt level which renders the transistor 22 nonconductive. This condition, therefore, provides no circuit path from the source +V to ground and no current flows through the common collector-emitter conduction paths of the transistors 22 and 23, and through the primary winding 31 of the transformer 32, and the current limiting resistor 33. Since there is no current flow through the primary winding 31, the detector circuit 55 detects no signal and provides a zero volt signal to the control input terminal 54 (see FIG. 4I) of the gate 51 which in turn disables the gate 51 from providing an output signal (see FIG. 4L). Since there is no current flow through the primary winding 31, there is no signal provided at the base electrode 36 of the transistor 37 (see FIG. 4E). Therefore, the detector circuit 41 senses no signal output from transistor 37 (see FIG. 4F) and provides a zero volt signal to the control terminal 46 of the gate 47 (see FIG. 4G) which disables the gate 47 from providing an output signal. The gates 47 and 51, for example, may be AND gates such as described in the previously referenced U.S. Pat. No. 3,600,604. In such an AND gate there is needed a negative enable signal at the control terminal concurrent with a periodic signal being provided to the signal input terminal so that a periodic signal may be produced at the output terminal.

At the time t1 the periodic signal provided to the base electrode 24 of the transistor 22 switches to a first signal state or positive signal level such as +V (see FIG. 4B). This signal makes the transistor 22 conductive, and since the signal applied to the base electrode 25 of the transistor 23 is also at a first signal state or positive level at this time (see FIG. 4A), the transistors 22 and 23 become concurrently conductive and current flows from the source +V through the collector-emitter path of the transistor 22, the primary winding 31 of the transformer 32, the current limiting resistor 33 and the collector-emitter path of the transistor 23 to circuit ground. Current begins to increase through the primary winding as illustrated by FIG. 4C. In response to the current flow through the emitter electrode of the transistor 22 the detector circuit 55 functions such that the current flows through the capacitor 56 and the diode 57 to circuit ground. The capacitor 59 remains uncharged at this time since the diode 58 is nonconductive (see FIG. 4I). This zero volt signal across capacitor 59 then is applied to the control input terminal of the gate 51, and disables the latter gate. At a time t2 the periodic signal from the tachometer 9 which is applied to the base electrode 25 of the transistor 23 returns to a second signal state or a zero volt level and the transistor 23 is cut off and the series current path through the transistors 22 and 23 is broken and current is no longer drawn (see FIG. 4C). In response to the absence of current flow through the primary winding 31 the magnetic field collapses at a rapid rate about the transformer 32 and voltage is induced in the secondary winding of the transformer 32 causing current flow in the secondary winding (see FIG. 4D). This voltage increase across the secondary winding is applied to the base electrode 36 of the transistor 37 (see FIG. 4E), and is positive enough, for example 0.6 volts, to cause the transistor 37 to become conductive and current flows from the source +V through the resistor 40, the collector-emitter path of the transistor 37 to circuit ground dropping the voltage at the collector electrode of transistor 37 essentially to 0 volts (see FIG. 4F). The transformer 32, therefore, stored energy while current flowed through primary winding 31. In response to the latter current no longer flowing, the field collapsed and the energy was transferred to the base electrode 36 of transistor 37. In response to the decrease voltage at the collector electrode of the transistor 37 the diode 44 becomes conductive and the voltage at the output plate of the capacitor 45 (the junction between the capacitor 45 and diode 44) switches from a zero volt level to a —V level due to the transfer of charge from capacitor 42 to capacitor 45. The resultant —V enable signal is applied to the terminal 46 of the AND gate 47 for enabling the latter gate (see FIG. 4G).

The oscillator 49 is continuously providing a periodic signal (see FIG. 4J) to the input signal input terminal 48 of the gate 47 and the gate 47, since it is receiving a negative enable signal at its controlled input terminal, provides at its output a periodic gate output signal. The latter signal in turn is provided to the signal input terminal 50 of the gate 51 (see FIG. 4K). This periodic signal is not passed by the gate 51 at this time since its control input terminal 54 is at a zero volt level.

At the time t3 the periodic signal input to the base electrode 24 of the transistor 22 again returns to the second signal state or a 0 volt level and the transistor 22 is biased off. The emitter electrode 29 of transistor 22 returns to a zero volt level at this time causing diode 58 to become conductive whereby charge is transferred from capacitor 56 to capacitor 59. The resultant charge on capacitor 59 is at a —V level, which enables the gate 51. In response thereto a periodic output signal is provided at the output terminal of gate 51. This latter signal (see FIG. 4L) is a vehicle movement control signal which is supplied to the alarm and braking network 53. In response to the latter signal, the network 53 permits the vehicle 2 to continue along the travel path 5 from point A to B (see FIG. 1). The alarm and braking network may be any known network which is responsive to an alternating current (AC or periodic signal input). Such networks are well known in the art and, for example, may have transformer coupling at the input or any combination of elements that is responsive only to varying amplitude input signals at predetermined frequencies. Such latter networks may also take the form of filter circuits. In the event such a periodic signal is not applied to the input of the alarm and braking network 53, an alarm is actuated and the vehicle is braked. How the apparatus 21 inhibits the provision of the latter periodic signal and in turn causes the vehicle to be braked is to be described shortly. This condition persists, transistor 22 being biased off until the latter periodic input signal once again returns to a first signal state or positive voltage level at the time t5. The enable signals provided to the control input terminals 46 and 54 of the gates 47 and 55 respectively remain at negative voltage levels, however, since the time constants of the detector circuits 41 and 55 respectively are chosen such that there is no appreciable discharge of voltage from the capacitors 45 and 59 as long as the signal input from the tachometers occurs at the repetition rates as illustrated. At the time t5 the transistors 22 and 23 again become concurrently conductive as was described before, and the system functions in a like manner as previously described.

At the point in time 60 (see FIG. 4A) the vehicle begins to roll back or travel in a reverse direction for one reason or another, and the signal outputs of the tachometers 9 and 12 reverse in a predetermined phase relationship. That is, the first and second signals are displaced from one another according to the previously described second predetermined phase relationship, that relationship being that the first signal state of the output signal from the tachometer 12 is 90° in phase ahead of the first signal state of the output signal from the tachometer 9. At the time t6 the input signal to the base electrode 25 of transistor 23 is at a second signal state or 0 volt level (see FIG. 4A). The transistor 23 is therefore held nonconductive and the series conduction path through the primary winding 31 of the transformer 32 is open irrespective of the first signal state or positive signal level applied to the base electrode 24 of the transistor 22 (see FIG. 4B). At time t7 the input signal from the tachometer 9 applied to the base electrode 25 of the transistor 23 switches to the first signal state or +V voltage level rendering the transistor 23 conductive. Concurrent with this there is, as was previously mentioned, also the first signal state of +V voltage level signal applied to the base electrode 24 of the transistor 22 and current flows from the source +V to circuit ground through the latter transistors and the primary winding 31 of the transformer 32 and the current limiting resistor 35. The current flow through the primary winding 31 of the transformer 32 stores energy in the transformer and is illustrated by FIG. 4C. At the time t8 the input signal to the transistor 22 returns to the second signal state or 0 volts. This would normally cut the transistor 22 off but since however the primary winding 31 is connected to circuit ground thorugh the conducting transistor 23, the emitter electrode 29 of the transistor 22 is driven sufficiently negative by the back electromotive force of the transformer 32 to keep current flowing through the latter current path. Since the current is still flowing (see FIG. 4C) the collapse of the field about the transformer 32 does not occur at a rapid enough rate to induce sufficient voltage at the base electrode 36 and the transistor 37 is, therefore, biased off. The collector electrode 39 of the latter transistor therefore is essentially at a voltage of +V and the diode 44 is biased off and the diode 43 is biased on. The voltage on the capacitor 45 returns to zero volts as the negative voltage is dissipated by the gate 47. The 0 volts which is now applied to the control terminal 46 of the gate 47 biases the gate 47 off and no gate output signal is provided to the input terminal 50 of the gate 51, in turn there is no vehicle movement control signal applied to the alarm and braking network 53. In response to the absence of a periodic signal input, the alarm and braking network 53 applies brakes and stops the vehicle 2. This is irrespective of the control signal applied to the control input terminal 54 of the gate 51. It may be seen that this latter control signal is at a zero volt level since the current flow through the primary winding of the transformer 31 maintains the diode 57 conductive and the diode 58 non-conductive whereby the charge across the capacitor 56 is not transferred to the capacitor 59. At the time t9 the cycle again repeats itself as described for the time t7.

In summary, the operation and function of the apparatus 21 has now been described for both predetermined phase relationships of the tachometer output signals. It has been shown that the vehicle movement control signal is provided so long as the vehicle is moving in a forward direction as manifested by the first and second output signals from the tachometers 9 and 12, respectively, being displaced relative to one another in the first predetermined phase relationship. Also, it has been shown how the vehicle movement control signal has been inhibited and in turn the vehicle braked in the event the output signals from the tachometers 9 and 12 are displaced relative to one another in the second predetermined phase relationship, which indicates the vehicle is in a roll-back condition and is traveling in the reverse direction.

I claim:

1. In a system for sensing the direction of movement of a vehicle, the combination comprising:
   a first tachometer means operative with said vehicle for producing a first signal in response to the movement of said vehicle;
   a second tachometer means operative with said vehicle for producing a second signal in response to the movement of said vehicle, said second signal being in a first predetermined phase relationship relative to said first signal in response to said vehicle moving in a first direction, and with said second signal being in a second predetermined phase relationship relative to said first signal in response to said vehicle moving in the opposite direction;
   first and second switch means having their conduction paths connected in series, said first switch means closing in response to the production of said first signal, and said second switch means closing in response to the production of said second signal;
   means for providing a vehicle movement control signal in response to said first switch means initially closing followed by said second switch means closing; and
   means for inhibiting the provision of said vehicle movement control signal in response to said second switch means initially closing followed by said first switch means closing.

2. In a system for sensing the forward and reverse movement of a vehicle along a vehicle travel path, the combination comprising:
   a first tachometer means operative with and aligned with the drive means of said vehicle for producing a first signal having first and second signal states;
   a second tachometer means operative with and aligned with the drive means of said vehicle for producing a second signal having first and second signal states, said second tachometer being aligned relative to said first tachometer such that the first signal state of said first signal leads the first signal state of said second signal by a first predetermined angle when said vehicle is traveling in the forward direction, and the first signal state of said second signal leads the first signal state of said first signal by a second predetermined angle, which may equal said first predetermined angle when said vehicle is traveling in the reverse direction;
   first and second transistors each having base, collector and emitter electrodes, the base electrode of said first transistor being connected to said first tachometer means for receiving said first signal, and the base electrode of said second transistor being connected to said second tachometer means for receiving said second signal, each of said first and second transistors being made conductive in response to said first and second signals being in the first signal state, respectively;
   a signal storage means connected in series with the collector-emitter conduction paths of said first and second transistors for storing a third signal in response to said first and second transistors being made concurrently conductive; and
   signal output means responsive to the storage of said third signal for providing a vehicle movement control signal.

3. The combination claimed in claim 2 wherein said signal output means comprises:
   an amplifier means for amplifying the stored third signal for producing a fourth signal;
   a first detector means for producing a first enable signal in response to the provision of said fourth signal;
   signal means for providing a periodic signal;
   a first gate means having a signal input, a control input, and an output, the signal input being connected to said signal means for receiving said periodic signal, the control input being connected to said first detector means for receiving said first enable signal, with a first gate output signal being provided at the output of said first gate means in response to the concurrent provision of said periodic signal and said first enable signal to the signal input and the ocntrol input, respectively; and
   means responsive to the provision of said first gate output signal for providing said vehicle movement control signal.

4. The combination claimed in claim 3 wherein said last-named means comprises:
   a second detector means operative with said second transistor and responsive to said second transistor being conductive for providing a second enable signal;
   a second gate means having a signal input connected to the output of said first gate means, a control input operative with said second detector means for receiving said second enable signal, and an output where said movement control signal is provided in response to the concurrent provision of said first gate output signal and said second enable signal to the signal input and the control input, respectively, of said second gate means.

5. In a system for sensing the direction of movement of a vehicle, the combination comprising:
   means for providing first and second signals displaced relative to one another in a first predetermined phase relationship in response to said vehicle moving in a first direction, with said first and second signals being displaced relative to one another in a second predetermined phase relationship in response to said vehicle moving in the opposite direction;
   first and second switch means having their conduction paths connected in series, said first switch means closing in response to the production of said first signal, and said second switch means closing in response to the production of said second signal;
   means for providing a vehicle movement control signal in response to said first switch means initially closing followed by said second switch means closing; and
   means for inhibiting the provision of said vehicle movement control signal in response to said second switch means initially closing followed by said first switch means closing.

6. In a system for sensing the forward and reverse movement of a vehicle along a vehicle travel path, the combination comprising:

first means operative with said vehicle for producing a first signal having first and second signal states;

second means operative with said vehicle for producing a second signal having first and second signal states, with the first signal state of said first signal leading the first signal state of said second signal by a first phase angle when said vehicle is traveling in the forward direction, and the first signal state of said second signal leads the first signal state of said first signal by a second phase angle when said vehicle is traveling in the reverse direction;

first and second transistors each having base, collector and emitter electrodes, the base electrode of said first transistor being operative with said first means for receiving said first signal, and the base electrode of said second transistor being operative with said second means for receiving said second signal, each of said first and second transistors being made conductive in response to said first and second signals being in the first signal state, respectively;

a signal storage means connected in series with the collector-emitter conduction path of said first and second transistors for storing a third signal in response to said first and second transistors becoming concurrently conductive; and means responsive to the storage of said third signal for providing a vehicle movement control signal.

7. The combination claimed in claim 6, wherein said signal storage means comprises a transformer.

8. The combination claimed in claim 7, wherein said means responsive to the storage of said third signal includes a detector.

* * * * *